(12) United States Patent
Marvelley

(10) Patent No.: US 10,654,653 B1
(45) Date of Patent: May 19, 2020

(54) CONVEYOR BELT FLAKING ROLLER AND SYSTEM

(71) Applicant: ContiTech USA, Inc., Fairlawn, OH (US)

(72) Inventor: Scott Marvelley, Croydon Hills (AU)

(73) Assignee: ContiTech Transportbandsysteme GmbH, Hannover (DE)

(*) Notice: Subject to any disclaimer, the term of this patent is extended or adjusted under 35 U.S.C. 154(b) by 0 days.

(21) Appl. No.: 16/398,276

(22) Filed: Apr. 30, 2019

(51) Int. Cl.
| | | |
|---|---|---|
| *B65G 21/20* | (2006.01) | |
| *B65G 15/00* | (2006.01) | |
| *B65G 21/00* | (2006.01) | |
| *B65G 15/30* | (2006.01) | |
| *B23P 6/00* | (2006.01) | |

(52) U.S. Cl.
CPC ............... *B65G 21/20* (2013.01); *B23P 6/00* (2013.01)

(58) Field of Classification Search
None
See application file for complete search history.

(56) References Cited

U.S. PATENT DOCUMENTS

| | | | | |
|---|---|---|---|---|
| 3,809,211 | A * | 5/1974 | Padilla | B65G 21/00 198/501 |
| 5,174,435 | A | 12/1992 | Dorner et al. | |
| 5,680,925 | A | 10/1997 | Gallagher et al. | |
| 8,196,737 | B2 | 6/2012 | Brayman et al. | |
| 8,240,463 | B2 | 8/2012 | Graber et al. | |
| 9,162,826 | B2 * | 10/2015 | Silva | B65G 39/04 |
| 9,702,853 | B2 * | 7/2017 | Wallace | B65G 43/02 |
| 2015/0231747 | A1 | 8/2015 | Hamilton et al. | |

FOREIGN PATENT DOCUMENTS

| | | |
|---|---|---|
| EP | 1584580 A1 | 10/2005 |
| FR | 2663309 A1 | 12/1991 |

* cited by examiner

*Primary Examiner* — Kavel Singh
(74) *Attorney, Agent, or Firm* — Gregory J. Adams; David L. Cate

(57) ABSTRACT

Conveyor belt flaking systems include a plurality of conveyor belt segments, each of the segments having opposing splice-able distal ends, a cable winch positioned proximate to a first end of the conveyor belt flaking system and at least one of the plurality of conveyor belt segments positioned proximate an opposing second end of the flaking system, a plurality of support pipes for supporting the conveyor belt segments when laid in a flake run of the conveyor belt flaking system, at least one hold-back drum insertable into one of the plurality of support pipes, a plurality of belt support A-frames for securing a cable from the cable winch and supporting one of the plurality of conveyor belt segments when introduced onto the flake run, and a two directional flaking roller attachable to the cable from the cable winch.

20 Claims, 8 Drawing Sheets

CONVEYOR BELT FLAKING ROLLER AND SYSTEM

FIELD

The field to which the disclosure generally relates is conveyor belt installation systems, and more particularly to conveyor belt flaking systems and methods utilizing a two directional flaking roller.

BACKGROUND

This section provides background information to facilitate a better understanding of the various aspects of the disclosure. It should be understood that the statements in this section of this document are to be read in this light, and not as admissions of prior art.

There are a number of features which are important in the use of a conveyor belt system for a large scale industrial or mining operation. One of these features is the ease and quickness of removal, and precise replacement of the belt, or portions thereof. Replacement of the conveyor belt, or portions thereof, is commonly referred to as belt flaking.

State of the art methods of conveyor belt replacement utilize equipment and techniques based upon out dated technology, requiring constant use of mobile plant and interaction with personnel, and high manual-handling work content. The end result is often poor control of belt guiding and alignment on the conveyor system, which can result in inefficiency of operations, lost time for further repair, or even damage to the conveying system equipment.

Thus, there is an ongoing need for belt replacement equipment and techniques which reduce mobile plant reliance and reduce manual handling, while improving control of belt guiding and alignment, ergonomics and general ease of installation, such need met, at least in part, with embodiments according to the following disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments of the disclosure, conveyor belt flaking systems include a plurality of conveyor belt segments, each of the segments having opposing splice-able distal ends, a cable winch positioned proximate to a first end of the conveyor belt flaking system and at least one of the plurality of conveyor belt segments positioned proximate an opposing second end of the flaking system, a plurality of support pipes for supporting the conveyor belt segments when laid in a flake run of the conveyor belt flaking system, at least one hold-back drum insertable into one of the plurality of support pipes, a plurality of belt support A-frames for securing a cable from the cable winch and supporting one of the plurality of conveyor belt segments when introduced onto the flake run, and a two directional flaking roller attachable to the cable from the cable winch. In some aspects, the conveyor belt flaking system further includes at least one pair of side guide supports, each support of the pair positioned on opposing sides of the flake run.

In some cases, the two directional flaking roller has an inner drum attachable to the cable from the cable winch, and an outer rotatable section disposed around and circumferentially outward of the inner drum. The outer rotatable section may have a plurality of rollers disposed on the periphery of the outer rotatable section, and a plurality side rollers disposed on both sides of the outer rotatable section.

The conveyor belt flaking system may have at least one of the plurality of belt support A-frames positioned within the flake run proximate the first end A of the flaking system, and further, in some cases, at least two of the plurality of belt support A-frames positioned proximate the opposing second end B of the flaking system. A pair of hold-back counterweights may be attached to one of the at least two of the plurality of belt support A-frames positioned proximate the opposing second end B of the flaking system.

According to some aspects of the disclosure, the two directional flaking roller evenly lays a first portion of one of the plurality of conveyor belt segments along the flake run beginning from a start located proximate the opposing second end B of the flaking system. Also, the first portion of one of the plurality of conveyor belt segments may be evenly laid along the flake bed from the start to an end located proximate the first end A of the flaking system. In some cases, at least one of the plurality of conveyor belt segments is wrapped around at least one of the plurality of support pipes.

In some further aspects of the disclosure, the two directional flaking roller may be used to evenly lay a second portion of the plurality of conveyor belt segments along the flake run from an end located proximate the first end A of the flaking system to a start located proximate the opposing second end B of the flaking system.

Some other embodiments of the disclosure are methods of preparing a conveyor belt flake run which includes providing a conveyor belt flaking system having:

- a plurality of conveyor belt segments, each of the segments having opposing splice-able distal ends;
- a cable winch positioned proximate to a first end of the conveyor belt flaking system and the plurality of conveyor belt segments positioned proximate an opposing second end of the flaking system;
- a plurality of support pipes for supporting the conveyor belt segments when laid in a flake run of the conveyor belt flaking system;
- at least one hold-back drum insertable into one of the plurality of support pipes;
- a plurality of belt support A-frames for securing a cable from the cable winch and supporting one of the plurality of conveyor belt segments when introduced onto the flake run; and,
- a two directional flaking roller attachable to the cable from the cable winch.

An end of a first conveyor belt segment is secured at a starting end of the conveyor belt flake run, and one or more of the conveyor belt segments is pulled along the conveyor belt flake run toward the first end A of the conveyor belt flaking system by the two directional flaking roller attached to the cable from the cable winch. The two directional flaking roller is then returned to a position proximate the starting end B of the conveyor belt flake run. In some cases, the two directional flaking roller evenly lays a second portion of one of the plurality of conveyor belt segments along the flake run from an end located proximate the first end A of the flaking system to a start located proximate the opposing second end B of the flaking system.

A hold-back drum, inserted into one of the plurality of support pipes, is placed on the conveyor belt segment adjacent the two directional flaking roller, and secured in place. The two directional flaking roller is pulled over the conveyor belt and support pipe housing the secured holdback drum. Then, one or more additional conveyor belt segments may be pulled along the conveyor belt flake run toward the first end A of the conveyor belt flaking system by the two directional flaking roller attached to the cable from the cable winch. In some aspects, a secondary winch and secondary cable are provided for the returning the two directional flaking roller to a position proximate the starting end B of the conveyor belt flake run.

According to some aspects, multiple support pipes, for retaining conveyor belt segments, may be used at both ends of the flake run. In some cases, at least one pair of side guide supports is placed between the starting end B of the conveyor belt flake run and the first end A of the conveyor belt flaking system. The at least one pair of side guide supports may be in either an upright or a retracted position.

According to some aspects, first belt support A-frame is positioned proximate the starting end B of the conveyor belt flake run, and a second belt support A-frame is positioned proximate the first end A of the conveyor belt flaking system. In some cases, a third belt support A-frame is positioned proximate the starting end B of the conveyor belt flake run. A conveyor belt splicing zone may be positioned between the first belt support A-frame and the third belt support A-frame.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
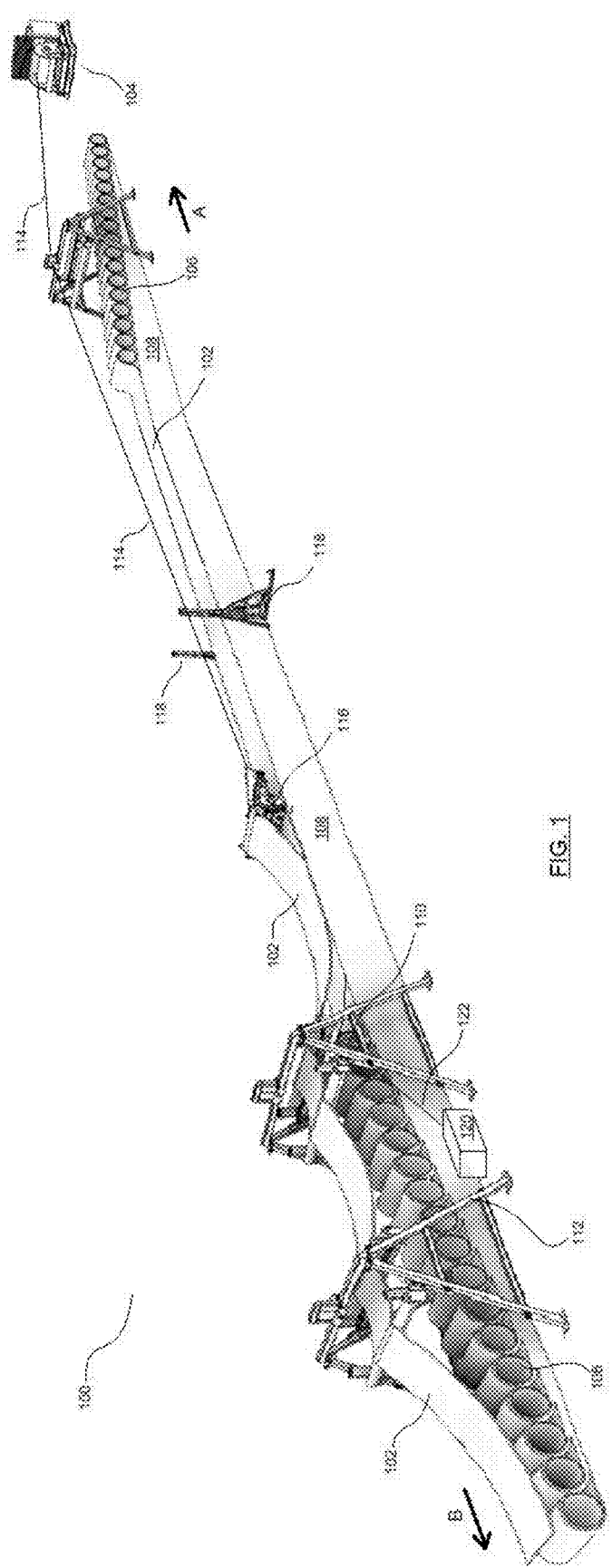
FIG. 1 illustrates some conveyor belt flaking system embodiments according to the disclosure, in a perspective view.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a range or dimension listed or described as being useful, suitable, or the like, is intended that any and every value or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure are directed to belt flaking systems and techniques, useful for assisting with the pre-splicing and stacking operations of heavyweight conveyor belts. The associated hardware and equipment are designed to form a system that will easily and effectively form multiple belt lengths into a 'stack' ready to be pulled onto a nominated conveyor system. Efforts have been made through design to reduce the amount of manual handling and vehicular interaction typically involved with belt flaking procedures along with reducing the amount of friction and pulling force required to pull and position the belt along the flake. Furthermore, the modular system is designed to pack-down for transport from site-to-site.

Now referencing FIG. 1 which depicts some conveyor belt flaking system embodiments according to the disclosure, in a perspective view. The conveyor belt flaking system 100 shown has a first end of the flaking system in direction A, and an opposing second end (also referred to as a starting end) of the flaking system in direction B. Conveyor belt flaking system 100 is used for pre-splicing and stacking conveyor belts segments 102, which are generally sourced from the opposing second end of the flaking system in direction B. A primary cable winch 104 may positioned proximate to the first end of the flaking system in direction A for pulling conveyor belts segments 102. The conveyor belt segments 102 are spliced, pulled and disposed, or otherwise laid upon one another, and wrapped around a plurality of support pipes 106 (34 shown) for securing and supporting the conveyor belt segments 102 in an organized and efficient manner. The plurality conveyor belt segments 102, as spliced and disposed upon one another form the flake run 108 of the conveyor belt flaking system 100.

In some aspects of the disclosure, one or more hold-back drum(s) 110 are inserted into one or more of the plurality of support pipes 106 and appropriately anchored to hold one or more of the support pipes 106 in a static position. Two or more belt support A-frames 112 (3 shown) are used in the conveyor belt flaking system 100, where one or more belt support A-frames 112 are positioned proximate each of the first end of the flaking system in direction A, and the opposing second end of the flaking system, in direction B. Belt support A-frames 112 may be used to support and guide the one of the plurality of conveyor belt segments 102 when introduced onto the conveyor belt flaking system 100. Belt support A-frames 112 may also be used to support and guide a cable 114 from one or more cable winches 104.

With respect to cable 114, which is used to connect with and pull the two directional flaking roller 116 in direction A, cable 114 is depicted as spooled from/onto cable winch 104 disposed proximate the first end of the flaking system in direction A. However, in some alternate embodiments of the disclosure, an opposing cable 114 may spooled from/onto a secondary cable winch positioned proximate the opposing second end of the flaking system, in direction B, and such an opposing cable may be used to connect with and pull the two directional flaking roller 116 in direction B. In yet another aspect of the disclosure, the same cable 114 may be spooled from/onto cable winch 104 located proximate the first end of the flaking system in direction A, and used to pull two directional flaking roller 116 in both direction A and direction B, with appropriate rigging to accommodate bidirectional pulling.

The conveyor belt flaking system 100 may further include one or more pair of side guide supports 118 for maintaining alignment of the conveyor belt segments 102 as flake run 108 is built, or otherwise stacked, as well as for securing and stabilizing flake run 108. Conveyor belt flaking system 100 may further include one or more opposing pair hold-back counterweights 120 connected to each of the one or more hold-back drum(s) 110 by hold-back counterweight cables 122.

Figure 2:
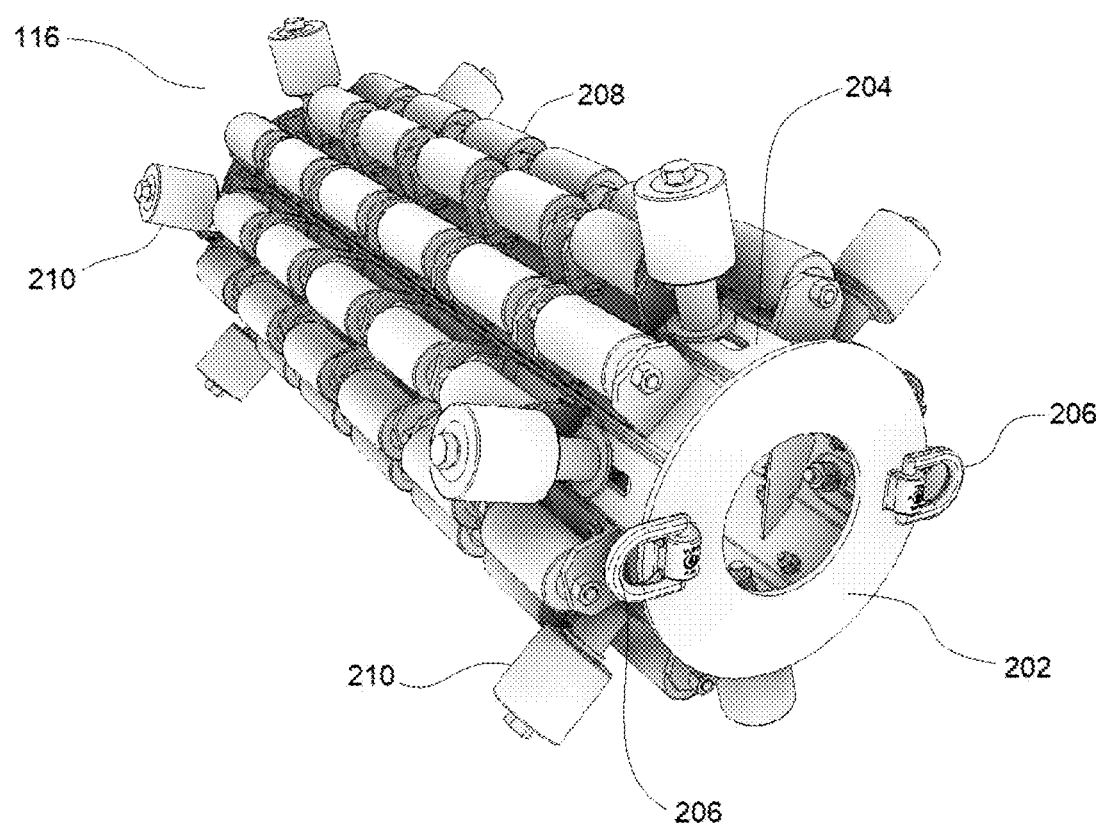
FIG. 2 depicts, in a perspective view, a two directional flaking roller in greater detail, according to the disclosure.

With reference to FIG. 2, the two directional flaking roller 116 is depicted in greater detail, in a perspective view. Two directional flaking roller 116 includes flaking roller inner drum 202 around which flaking roller outer rotatable section 204 freely rotates. Flaking roller inner drum 202 further includes inner drum lugs 206 for forming a connection with the cable, such as cable 114 and/or a secondary cable. Flaking roller outer rotatable section 204 generally includes rollers 208 disposed on the periphery of the outer rotatable section (34 shown) and side rollers 210 disposed on opposing sides of the outer rotatable section (9 shown).

Figure 3:
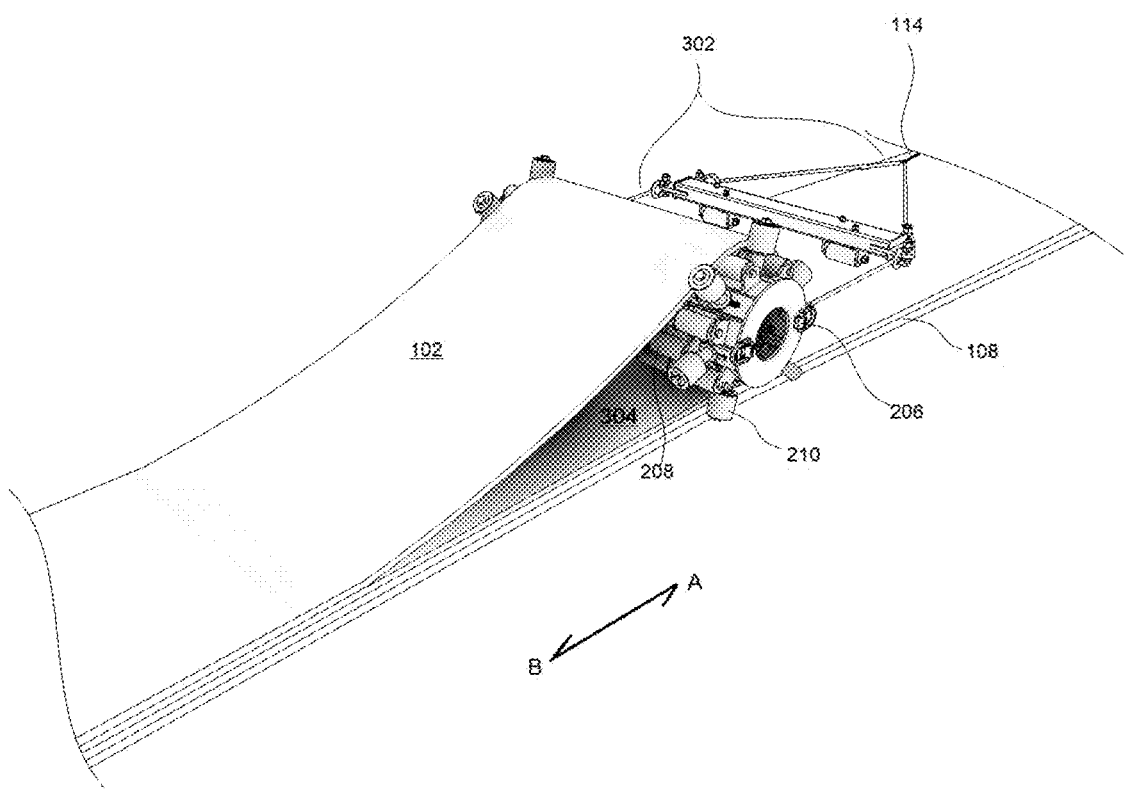
FIGS. 3 and 4 show a two directional flaking roller may be used for disposing and aligning conveyor belt segments onto a flake run, in perspective and side views, in accordance with the disclosure.

FIG. 3 shows how the two directional flaking roller 116 may be used for disposing and aligning conveyor belt segments 102 onto flake run 108. As depicted, conveyor belt segment 102 is sourced from direction B while two directional flaking roller 116 is pulled in direction A by cable 114 attached to spread bar and rigging gear 302. Conveyor belt segment 102 is wrapped around the periphery of two directional flaking roller 116 and disposed upon the conveyor belt flake run 108. As conveyor belt segment 102 releases from rollers 208 of flaking roller outer rotatable section 204, side rollers 210 help ensure vertical alignment of conveyor belt segment 102 onto flake run 108 thus forming new conveyor belt layer 304.

Figure 4:
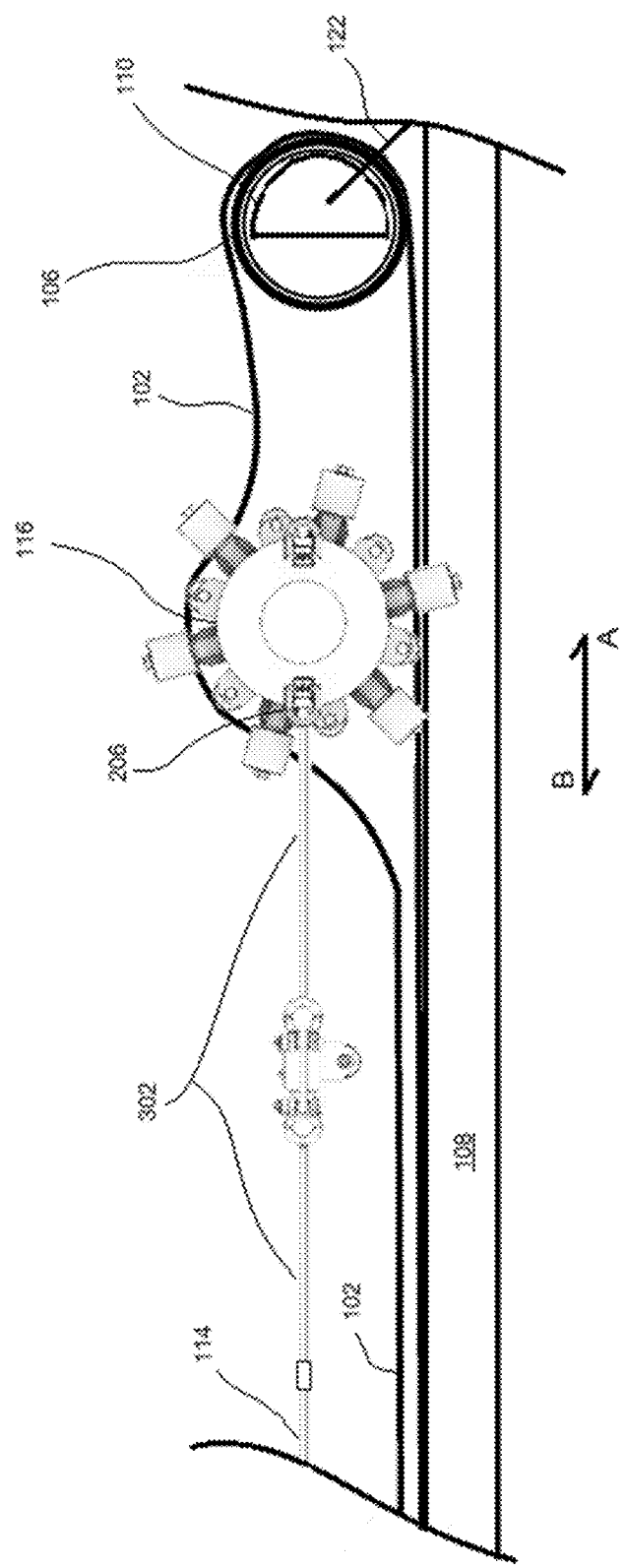

As illustrated in FIG. 4, after reaching the first end, or a position near the first end, of the flaking system in direction A, conveyor belt segment 102 may then be wrapped around support pipe 106 having hold-back drum 110 installed therein and secured to hold support pipe 106 in a static position. Two directional flaking roller 116 may then be pulled in direction B by cable 114, or a secondary cable, to opposing second end, or near the opposing second end, of the flaking system 100.

Figure 5:
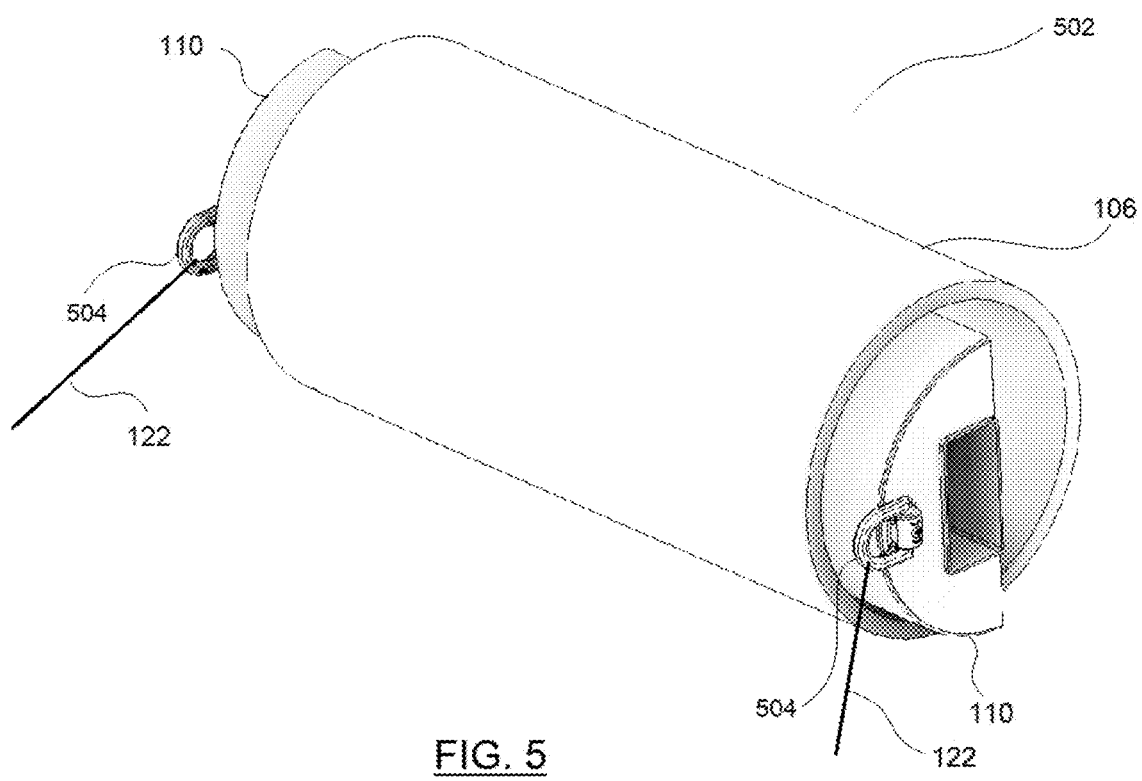
FIG. 5 illustrates, in a perspective view, a hold-back drum installed in support pipe in accordance with the disclosure.

Now referencing FIG. 5 which depicts a hold-back drum installed in support pipe, as arrangement 502. The arrangement 502 include hold-back drum 110 inserted into pipe 106. Hold-back drum 110 includes lugs 504 for securely connecting with hold-back counterweight cables 122, which may be secured to hold-back counterweights 120.

Figure 6:
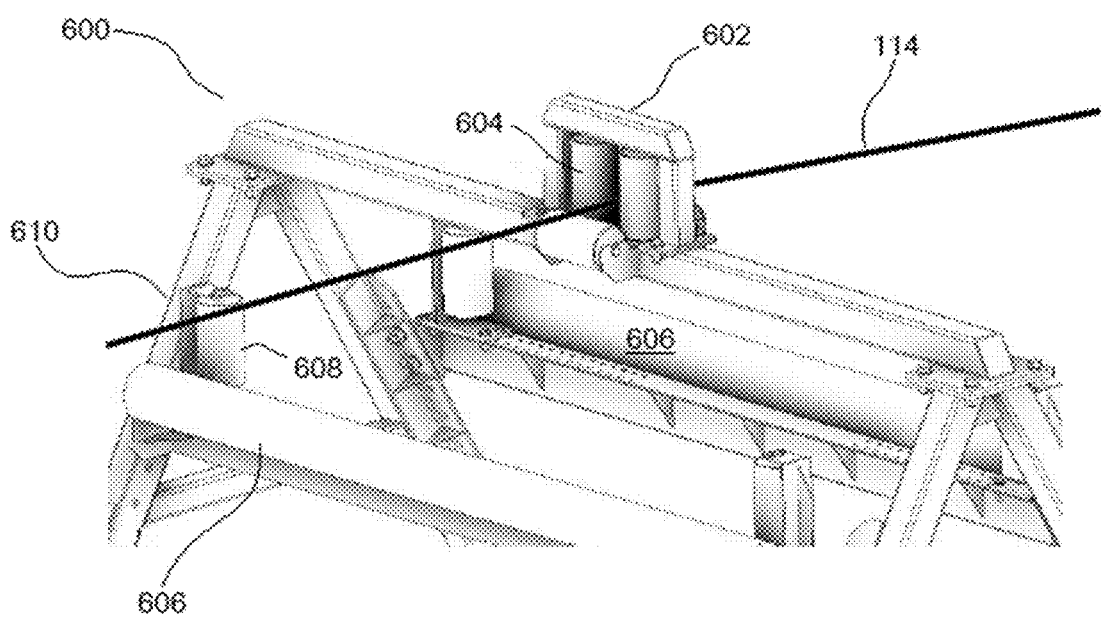
FIG. 6 depicts, in a perspective view, some details of top portions of belt support A-frames, according to the disclosure; and, FIGS. 7 and 8 show, in perspective and side views, elements and features of the one or more pair of side guide supports for aligning conveyor belt segments as the flake run is stacked, in accordance with some aspects of the disclosure.

FIG. 6 shows some elements of top portions of belt support A-frames 112, where the belt support A-frame top portion 600 includes winch cable guide 602 having winch cable guide rollers 604 therein (3 shown), conveyor belt segment support rollers 606 (2 shown), and conveyor belt segment lateral guide rollers 608 (3 shown). Each of these elements may be securely attached, either directly or indirectly, with belt support A-frame structure 610.

Figure 7:
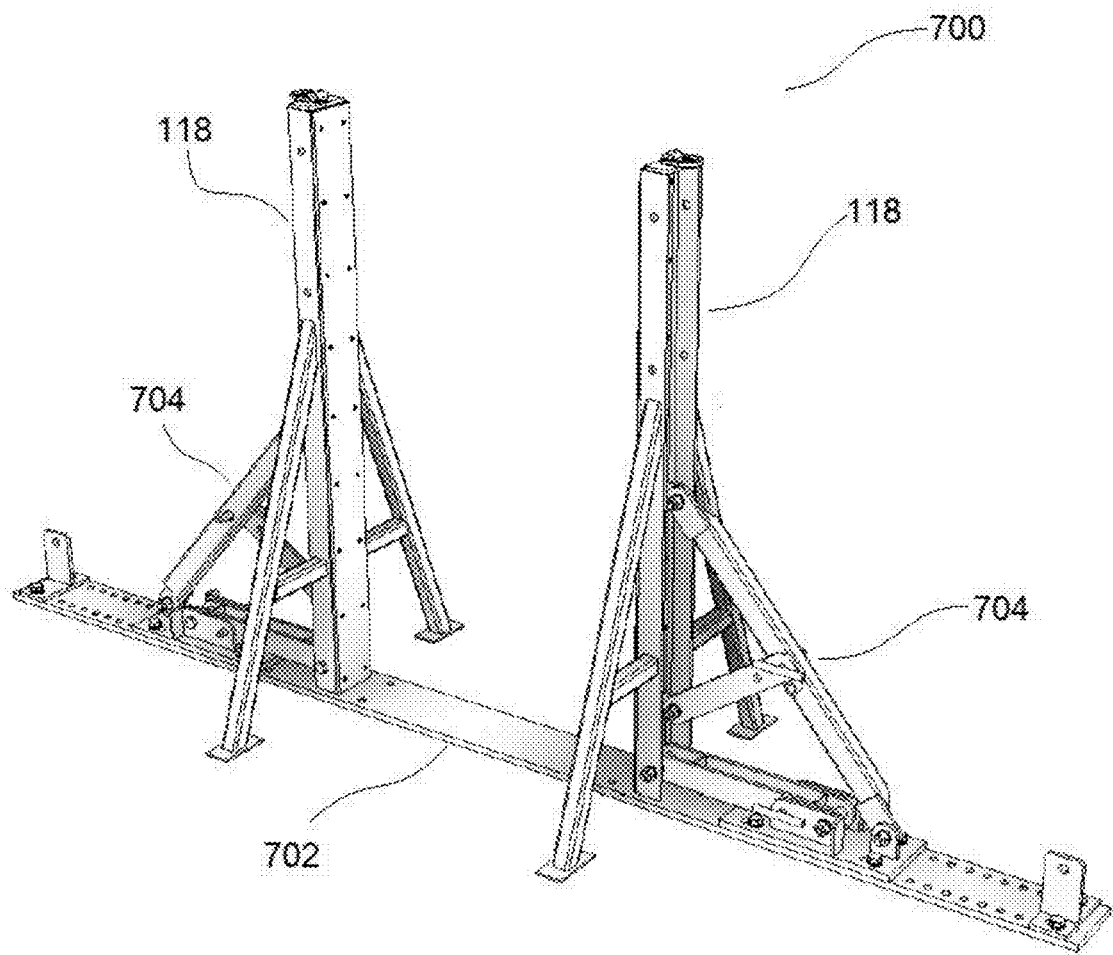
Figure 8:
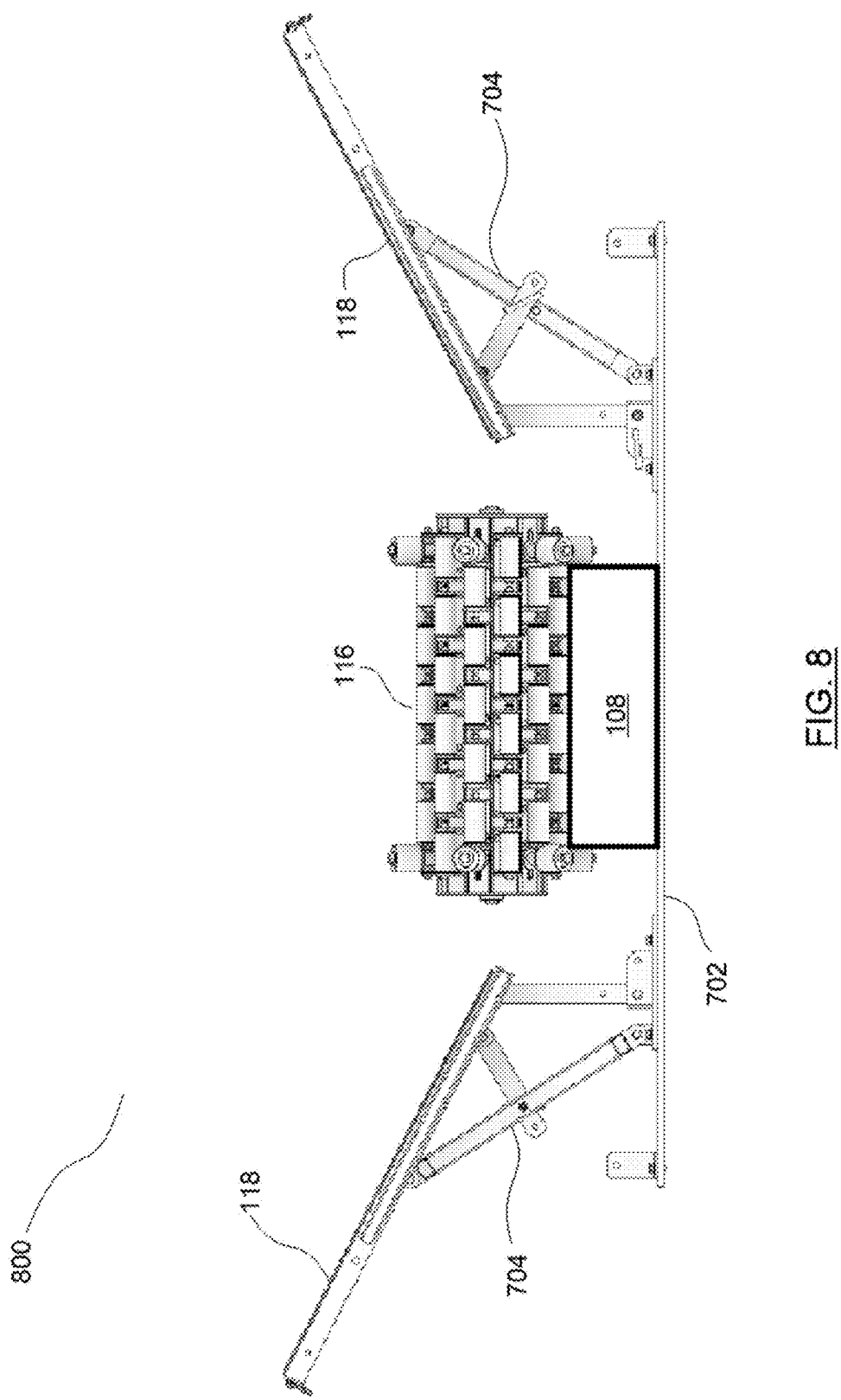

FIGS. 7 and 8 illustrate some elements and features of the one or more pair of side guide supports 118 for aligning conveyor belt segments 102 as flake run 108 is stacked, or otherwise built. FIG. 7 shows the pair of side guide supports 118 in an upright position 700, while FIG. 8 shows the pair of side guide supports 118 in a retracted position 800. The pair of side guide supports 118 may be connected to a common base plate 702, and each of the side guide supports may include a movable support strut system 704 for retracting the pair of side guide supports 118 and also for locking the pair of side guide supports 118 in upright position 700. Movable support strut systems 704 are useful for retracting each of the side guide supports to accommodate, or otherwise make lateral space for, two directional flaking roller 116 when moving between the pair of side guide supports 118 while building as flake run 108. After two directional flaking roller 116 has moved past the pair of side guide supports 118, the pair of side guide supports 118 may be put in the upright position 700 to maintaining alignment and stability of the conveyor belt segments 102 forming the flake run 108.

Some embodiments of the disclosure are also directed to processes of forming a conveyor belt flake run. In some cases, the work area surveyed, and a centerline of the flake run is marked out. At least one cable winch 114 may be put in place, by aligning, leveling and securing to a base or counterweighting system. The positions along the flake run where the side-guide belt supports 118 are marked and the pair(s) of side guide frames 118 are assembled and aligned for operation. Each of at least one of the support A-frames 112 is position near a first end of the conveyor belt flaking system 100 in direction A, and near an opposing second end of the flaking system 100 in direction B. Counterweight block(s) may be disposed on each side of each belt support A-frame and anchored in-place using appropriately sized rigging equipment. Hold-back drum counterweights 120 may be positioned in place at the start of the flake run, near the end in direction B.

With regards to the two directional flaking roller 116, side guide rollers 210 are adjusted to provide a gap between the rollers 210 to suit the width of belt segments 102. A hold-back drum 110 is installed into a support pipe 106, then position at the belt support A-frame 112 positioned near the start of the flake system 100 in direction B.

In some cases, a secondary cable winch is securely positioned at the start-end of the flake system 100 in direction B. This secondary winch may serve to pull the two directional flaking roller 116 back along the flake run 108 to the start position for the next pull cycle. The associated winch cable should be fed through the guide rollers 604 at the top 600 of the belt support A-frames 112 help control the cable path.

The flake run 108 can begin to be formed, stacked, or otherwise built in the conveyor belt flaking system 100. Accordingly, winch cable 114 may be spooled from primary cable winch 104, through the guide rollers 604 at the top 600 of the belt support A-frame at the end of the flake run in direction A, as depicted in FIG. 1. Cable 114 may then be spooled out from cable winch 104, and ran along the flake-run to a conveyor belt end located at the start of the flake run in direction B.

The winch cable 114 may then be guided over the conveyor belt segment support roller 606 at the second a belt support A-frame located at the start of the flake run, in direction B. The winch cable 114 may be attached to a conveyor belt segment 102 using a rated pulling plate. The conveyor belt segment 102 may be moved forward and over a splicing station by the cable winch 104, and toward the flake run 108 area. The advancing belt-end of conveyor belt segment 102 may be pulled up and through the support A-frame 112 located at the start of the flake run in direction B. The advancing belt-end of conveyor belt segment 102 may be pulled underneath itself back toward the start of the flake (in direction B) and position under the respective belt support A-frame 112 to create a loop, and the end of conveyor belt segment 102 affixed to hold-back counterweights. The two directional flaking roller 116 may be placed into the belt loop of the conveyor belt segment 102, and then the spread bar and rigging gear 302 attached to the two directional flaking roller 116 and winch cable 114, now released from guide rollers 604 at the top 600 of the belt support A-frame at the start of the flake run 108 in direction B.

The two directional flaking roller 116 may be then be pulled along the flake run 108 using the primary cable winch 104. When the two directional flaking roller 116 passes a first pair side guide supports 118 in retracted position 800, the pull may be stopped, and the pair side guide supports 118 moved to an upright position 700, and against the edges of the conveyor belt segment 102 (the same is the case for any additional pair(s) of side guide supports 118). The pulling process may be continued until the two directional flaking roller 116 has been pulling down the end of the flake run 108 in direction A.

The spread-bar pulling and rigging gear 302 may then be moved into a reverse position in preparation for the two directional flaking roller 116 to be pulled back to the start of the flake, in direction B. The two directional flaking roller 116 may be moved to create a loop in the conveyor belt segment 102, and a length of secured support pipe 106 inserted in the loop. The two directional flaking roller 116 may be connected to a secondary winch, or alternative rigged to the primary winch, and pulled back along the flake run 108 under a top strand of conveyor belt segment(s) 102 to the starting end of the flake run 108, in direction B. As the two directional flaking roller 116 approaches pair(s) side guide supports 118, these may be placed in retracted position 800 and then returned to upright position 700 after the two directional flaking roller 116 has passed.

Two directional flaking roller 116 may then be positioned adjacent the base of the belt support A-frame near the start of the flake run 108. A support pipe 106, and hold-back drum 110 inserted into the support pipe 106, may be placed on the flake run 108 next to the two directional flaking roller 116. The hold-back drum 110 is then secured to counterweights 120. Tension is slowed applied from cable winch 104 to winch cable 114 (now rigged through guide rollers 604 at the top 600 of the belt support A-frame at the end of the flake run 108 in direction A) to move the two directional flaking roller 116 over the support pipe 106, and back down the flake run 108 in direction B. Pair(s) side guide supports 118 in upright position 700, may be placed in retracted position 800, as the two directional flaking roller 116 approaches, and then returned to upright position 700 after the two directional flaking roller 116 has passed.

The above process may be repeated for pulling conveyor belt segments 102 to build the flake run 108 for the entire conveyor belt.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE SIGNS (PART OF THE SPECIFICATION)

A Direction toward first and finishing end of the flaking system
B Direction toward opposing second and starting end of the flaking system
100 Conveyor belt flaking system
102 Conveyor belt segment(s)
104 Primary cable winch positioned proximate to first end
106 Plurality of support pipes (34 shown)
108 Flake run of the flaking system
110 Hold-back drum insertable into one of the plurality of support pipes;
112 Belt support A-frame(s) (3 shown)
114 Cable from the cable winch
116 Two directional flaking roller attachable to the cable from the cable winch
118 Pair of side guide supports
120 Hold-back counterweights
122 Hold-back counterweight cable
202 Flaking roller inner drum
204 Flaking roller outer rotatable section
206 Inner drum lugs
208 Rollers on the periphery of the outer rotatable section (34 shown)
210 Side rollers disposed on side of the outer rotatable section (9 shown)
302 Spread bar and rigging gear
304 New conveyor belt layer
502 Hold-back drum inserted into support pipe
504 Hold-back drum lugs
600 Top portion of belt support A-frame(s)
602 Belt support A-frame(s) winch cable guide
604 Winch cable guide roller (3 shown)
606 Conveyor belt segment support roller (2 shown)
608 Conveyor belt segment lateral guide roller (3 shown)
610 Belt support A-frame structure
700 Pair of side guide supports in upright position
702 Base plate
704 Movable support strut system
800 Pair of side guide supports in retracted position

What is claimed is:

1. A conveyor belt flaking system comprising:
a plurality of conveyor belt segments, each of the segments having opposing splice-able distal ends;
a cable winch positioned proximate to a first end of the conveyor belt flaking system and at least one of the plurality of conveyor belt segments positioned proximate an opposing second end of the flaking system;
a plurality of support pipes for supporting the conveyor belt segments when laid in a flake run of the conveyor belt flaking system;
at least one hold-back drum insertable into one of the plurality of support pipes;
a plurality of belt support A-frames for securing a cable from the cable winch and supporting one of the plurality of conveyor belt segments when introduced onto the flake run; and,
a two directional flaking roller attachable to the cable from the cable winch, the two directional flaking roller comprises an inner drum attachable to the cable from the cable winch, and an outer rotatable section disposed around and circumferentially outward of the inner drum, the inner drum includes drum lugs that form a connection with the cable, the outer rotatable section comprises a plurality of rollers disposed on the periphery of the outer rotatable section and rotatable about a first axis, and a plurality of side rollers disposed on both sides of the outer rotatable section and rotatable about a second axis, the first axis tangential to the outer rotatable section, and the second axis radial to the outer rotatable section.

2. The conveyor belt flaking system according to claim 1 further comprising at least one pair of side guide supports positioned on opposing sides of the flake run.

3. The conveyor belt flaking system according to claim 1 having at least one of the plurality of belt support A-frames positioned within the flake run proximate the first end of the flaking system.

4. The conveyor belt flaking system according to claim 1 having at least two of the plurality of belt support A-frames positioned proximate the opposing second end of the flaking system.

5. The conveyor belt flaking system according to claim 4 further comprising a pair of hold-back counterweights attached to one of the at least two of the plurality of belt support A-frames positioned proximate the opposing second end of the flaking system.

6. The conveyor belt flaking system according to claim 1, wherein the two directional flaking roller evenly lays a first portion of one of the plurality of conveyor belt segments along the flake run beginning from a start located proximate the opposing second end of the flaking system.

7. The conveyor belt flaking system according to claim 6, wherein the first portion of one of the plurality of conveyor belt segments is evenly laid along the flake bed from the start to an end located proximate the first end of the flaking system.

8. The conveyor belt flaking system according to claim 7, wherein the one of the plurality of conveyor belt segments is wrapped around one of the plurality of support pipes.

9. The conveyor belt flaking system according to claim 1, wherein the two directional flaking roller evenly lays a second portion of one of the plurality of conveyor belt segments along the flake run from an end located proximate the first end of the flaking system to a start located proximate the opposing second end of the flaking system.

10. The system of claim 1, wherein the plurality of side rollers are configured to ensure vertical alignment of the plurality of conveyor belt segments.

11. The system of claim 10, wherein the plurality of rollers on the periphery are configured to dispose the plurality of conveyor belt segments from a start end.

12. A method of preparing a conveyor belt flake run comprising:
  providing a conveyor belt flaking system comprising:
    a plurality of conveyor belt segments, each of the segments having opposing splice-able distal ends;
    a cable winch positioned proximate to a first end of the conveyor belt flaking system and the plurality of conveyor belt segments positioned proximate an opposing second end of the flaking system;
    a plurality of support pipes for supporting the conveyor belt segments when laid in a flake run of the conveyor belt flaking system;
    at least one hold-back drum insertable into one of the plurality of support pipes;
    a plurality of belt support A-frames for securing a cable from the cable winch and supporting one of the plurality of conveyor belt segments when introduced onto the flake run; and,
    a two directional flaking roller attachable to the cable from the cable winch having an outer rotatable section with a plurality of periphery rollers rotatable about a tangential axis and a plurality of side rollers rotatable about a radial axis;
  securing an end of a first conveyor belt segment at a starting end of the conveyor belt flake run;
  pulling one or more of the conveyor belt segments along the conveyor belt flake run toward the first end of the conveyor belt flaking system by the two directional flaking roller attached to the cable from the cable winch;
  returning the two directional flaking roller to a position proximate the starting end of the conveyor belt flake run;
  placing and securing the hold-back drum, inserted into one of the plurality of support pipes, on the conveyor belt segment adjacent the two directional flaking roller, and pulling the two directional flaking roller over the hold-back drum, inserted into one of the plurality of support pipes;
  pulling one or more additional conveyor belt segments along the conveyor belt flake run toward the first end of the conveyor belt flaking system by the two directional flaking roller attached to the cable from the cable winch.

13. The method of preparing a conveyor belt flake run according to claim 12 further comprising providing a secondary winch and secondary cable for the returning the two directional flaking roller to a position proximate the starting end of the conveyor belt flake run.

14. The method of preparing a conveyor belt flake run according to claim 12 further comprising providing support pipes for retaining conveyor belt segments at both ends of the flake run.

15. The method of preparing a conveyor belt flake run according to claim 12 further comprising providing at least one pair of side guide supports placed between the starting end of the conveyor belt flake run and the first end of the conveyor belt flaking system.

16. The method of preparing a conveyor belt flake run according to claim 15, wherein providing the at least one pair of side guide supports may be in either an upright or a retracted position.

17. The method of preparing a conveyor belt flake run according to claim 12, further comprising providing a first belt support A-frame is positioned proximate the starting end of the conveyor belt flake run, and wherein a second belt support A-frame is positioned proximate the first end of the conveyor belt flaking system.

18. The method of preparing a conveyor belt flake run according to claim 17, further comprising providing a third belt support A-frame is positioned proximate the starting end of the conveyor belt flake run.

19. The method of preparing a conveyor belt flake run according to claim 12, wherein providing the two directional flaking roller further comprises providing an inner drum attachable to the cable from the cable winch, and the outer rotatable section disposed around and circumferentially outward of the inner drum; and,
  wherein the outer rotatable section comprises the plurality of periphery rollers disposed on the periphery of the outer rotatable section, and the plurality of side rollers disposed on side of the outer rotatable section.

20. The method of preparing a conveyor belt flake run according to claim 12, wherein providing the two directional flaking roller further comprises laying a second portion of one of the plurality of conveyor belt segments along the flake run from an end located proximate the first end of the flaking system to a start located proximate the opposing second end of the flaking system.

* * * * *